United States Patent [19]

Takada et al.

[11] Patent Number: 4,892,692

[45] Date of Patent: Jan. 9, 1990

[54] PROCESS FOR PRODUCING SUBSTRATE FOR OPTICAL DISK BY ANNEALING SUBSTRATE WITH GRADIENT DOUBLE REFRACTION DISTRIBUTION

[75] Inventors: Kunio Takada, Kawasaki; Teruaki Okuda, Tokyo, both of Japan

[73] Assignee: Canon Kabushiki Kaisha, Tokyo, Japan

[21] Appl. No.: 148,687

[22] Filed: Jan. 26, 1988

[30] Foreign Application Priority Data

Jan. 30, 1987 [JP] Japan .................................. 62-18476

[51] Int. Cl.[4] .............................................. B29D 11/00
[52] U.S. Cl. ...................................... 264/106; 264/1.3
[58] Field of Search ................... 204/1.3, 106, 107, 2.6

[56] References Cited

U.S. PATENT DOCUMENTS 4,514,357  4/1985  Kawaguchi et al. ................ 264/106
4,627,809  12/1986  Okabayoshi et al. ............... 264/106

FOREIGN PATENT DOCUMENTS 20719  1/1986  Japan ..................................... 264/2.6

Primary Examiner—James Lowe
Attorney, Agent, or Firm—Fitzpatrick, Cella, Harper & Scinto

[57] ABSTRACT

In a process for producing a substrate for optical disks, first a disk-shaped substrate is formed with polycarbonate with such gradient distribution of double refraction that the value of double refraction is in a range from −10 to −30 nm in the vicinity of the external periphery of the substrate and is in a range from +10 to +30 nm in the vicinity of the center thereof, and then thus formed substrate is annealed.

12 Claims, 3 Drawing Sheets

4,892,692

PROCESS FOR PRODUCING SUBSTRATE FOR OPTICAL DISK BY ANNEALING SUBSTRATE WITH GRADIENT DOUBLE REFRACTION DISTRIBUTION

BACKGROUND OF THE INVENTION

1. Field of the Invention

The present invention relates to a process for producing a disk-shaped substrate adapted for use as substrate for compact disk, video disk, optical recording disk, magnetooptical recording disk or the like.

2. Related Background Art

As schematically shown by a cross-sectional view in FIG. 1, an optical disk is prepared by forming, on a face of a substrate 1 of a disk form or doughnut form (in this text a disk form in which a central concentric portion is removed), a recording surface 2 on which information is recorded or which is capable of recording information. In case of a medium of read-only memory (ROM) type, such as the video disk, said information recording surface 2 can be formed by forming a train of pits representing information on the surface of the substrate and depositing thereon a reflective film composed for example of aluminum. In case of a DRAW (direct-read-after-write) type medium such as a magnetooptical disk, said information recording surface 2 can be formed by forming a recording layer, capable of optical information recording and reproduction, on the substrate. In this case spiral or concentric guide grooves are often formed on the surface of the substrate. Such recording surface 2 is usually formed in an annular area of a predetermined width on the substrate.

The information recorded on an optical disk is read by irradiating the disk with a light beam from a side opposite to said recording surface, and converting the change in intensity of the light beam, which is transmitted in the substrate and reflected by the recording surface, into an electrical signal. In an optical disk it is an important target to reduce the loss in said intensity change, since a large double refraction in the light-transmitting member will reduce the intensity of light emerging from the disk, thus rendering the signal reading more difficult. Such problem of double refraction is already referred to for example in the U.S. patent application Ser. No. 804,250, column 2, line 9 to column 3, line 10, filed Dec. 4, 1985, and now abandoned, which is a continuation of the U.S. patent application Ser. No. 487,890 filed Apr. 22, 1983 and subsequently abandoned, or in the U.S. patent application Ser. No. 619,339, column 2, lines 15 to 16, filed Jun. 11, 1984 and now U.S. Pat. No. 4,737,947. Consequently in the conventional process, the substrate for optical disk has been so prepared that the double refraction is substantially zero over the entire surface when the substrate is completed.

However, the substrate prepared in this manner has been associated with a drawback, even if it is free from double refraction immediately after the preparation of showing considerable double refraction in the vicinity of the external periphery and in an area somewhat distant from said external periphery, as the result of exposure to high temperature in the formation of the reflective film thereon or in the transportation of the optical disk, or as the result of extended storage.

SUMMARY OF THE INVENTION

The object of the present invention is to avoid the above-mentioned drawbacks in the prior technology and to provide a process for producing a substrate for optical disk, in which double refraction is reduced even after heating or prolonged storage.

The above-mentioned object can be achieved, according to the present invention, by a process of producing a substrate for optical disk, comprising steps of molding a disk-shaped by means of polycarbonate resin with such a gradient distribution of double refraction that the value of said double refraction is in a range from −10 to −30 nm in the vicinity of external periphery and from +10 to +30 nm in the vicinity of center, and annealing thus molded substrate. The abovementioned values of double refraction are usually defined in positions corresponding to the information recording area. Therefore, the above-mentioned molding of substrate is made in such a manner that the double refraction is in a range from −10 to −30 nm at the external periphery of the information recording area and from +10 to +30 nm at the internal periphery of said area.

The magnitude of the double refraction is measured by a polarization microscope and is considered positive or negative respectively in a compression stress state or a tension stress state in the radial direction of the substrate.

DETAILED DESCRIPTION OF THE PREFERRED EMBODIMENTS

Figure 1:
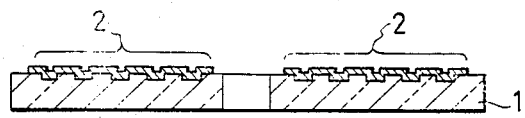
FIG. 1 is a schematic cross-sectional view of an ordinary optical disk.
Figure 2A:
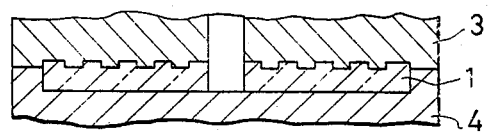
FIGS. 2A to 2C are schematic cross-sectional views showing steps of the process of the present invention for producing the optical disk substrate.
Figure 2B:
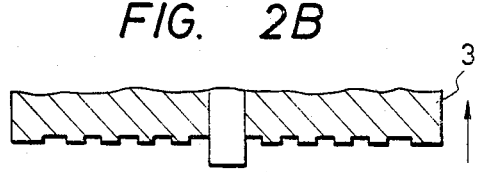
Figure 2B:
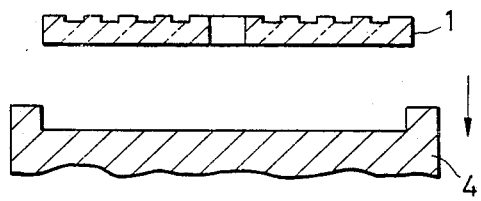
Figure 2C:
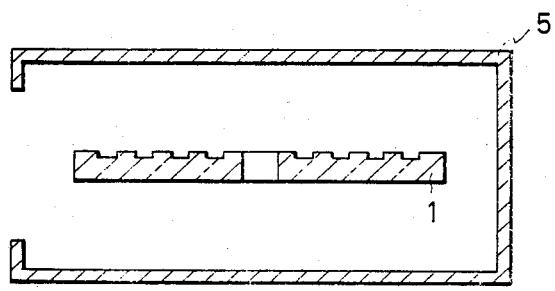

FIGS. 2A to 2C illustrate the process of producing an optical disk substrate according to the present invention. At first, as shown in FIG. 2A, a substrate 1 is injection molded by means of molds 3, 4. In this operation the temperature of the molds is elevated to 110°–130° C. or selected higher by 10°–20° C. at the external periphery than at the internal periphery, in order that the substrate after molding has a double refraction in a range of −10 to −30 nm in the vicinity of the external periphery of the recording area and in a range of +10 to +30 nm in the vicinity of the internal periphery thereof. Otherwise the injection speed may be gradually increased from the internal periphery toward the external periphery. The double refraction should remain almost constant on any concentric circle, and, more specifically, the fluctuation on a concentric circle should not exceed 5 nm.

Then the substrate is taken out from the molds 3, 4 as shown in FIG. 2B, and is annealed by heating for example in a drying oven 5 as shown in FIG. 2C. The heating is preferably conducted at a temperature lower by 10°–60° C. than the glass transition temperature of the plastic substrate, for a period of 1 to 6 hours, but these conditions are suitably regulated according to the plastic material employed and the thickness of the substrate. The substrate after annealing shows reduced double refraction at the external and internal peripheries, thus exhibiting limited double refraction over the entire surface.

An optical disk is prepared by forming a recording layer, a reflective layer, a protective layer etc. on thus molded substrate. This substrate scarcely shows increase in the double refraction even by heating at the formation of the recording layer etc. or even after prolonged storage.

In the following there will be given an example of the present invention and a reference example.

EXAMPLE

Polycarbonate resin AD5503 (glass transition point 150° C.) supplied by Teijin Kasei Co., Ltd. was injection molded with a 75 ton injection molding machine of Sumitomo Heavy Machinery Co., Ltd. to obtain a doughnut-shaped plastic substrate with an external diameter OD=150 mm$\phi$, an internal diameter ID=15 mm$\phi$ (having a central concentric hole) and a thickness t=1.2 mm. This plastic substrate has an annular recording area from 25 mm to 64 mm in the radius R from the center, and showed a gradient distribution of double refraction from a position at R=25 mm to a position at R=64 mm.

Figure 3A:
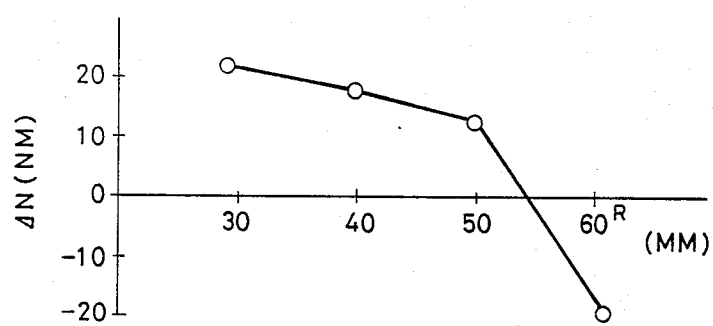
FIGS. 3A to 3C are charts showing the change in the distribution of double refraction in the optical disk substrate produced by the process of the present invention.

Said gradient distribution is illustrated in FIG. 3A, which shows the double refraction in a single pass (double refraction for the light transmitted once through the substrate) of said substrate immediately after molding, wherein the abscissa indicates the distance R from the center of disk, while the ordinate indicates the single-pass double refraction $\Delta n$. As shown in this chart, the double refraction shows a gradient distribution from +20 nm at a position on a circle at R=25 mm to −20 nm on a circle at R=64 mm.

In the present invention, the double refraction preferably decreases gradually from the internal periphery of the recording area toward the external periphery and falls rapidly to the negative range in the vicinity of the external periphery, as shown in FIG. 3A.

Said plastic substrate was then annealed (6 hours in an oven of 90° C.) to obtain an optical disk substrate.

Figure 3B:
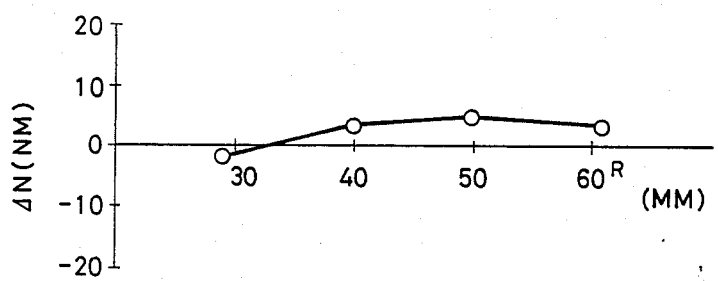

FIG. 3B shows the double refraction of said substrate after annealing. In this manner the range of double refraction, which was as large as ±20 nm, could be reduced to ±10 nm by suitable heat treatment.

Figure 3C:
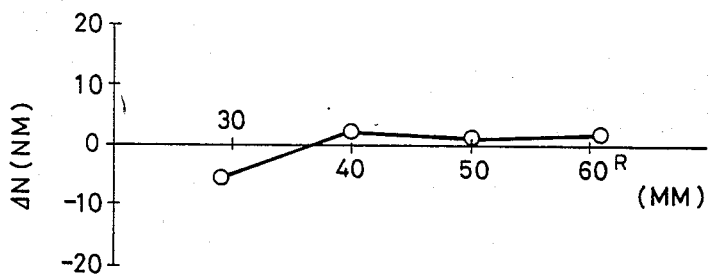

FIG. 3C shows the double refraction of said substrate after it was again placed in an oven of 90° C. for 6 hours. It is evident that the double refraction, after suitable heat treatment, no longer changes by repeated heat application.

REFERENCE EXAMPLE

Figure 4A:
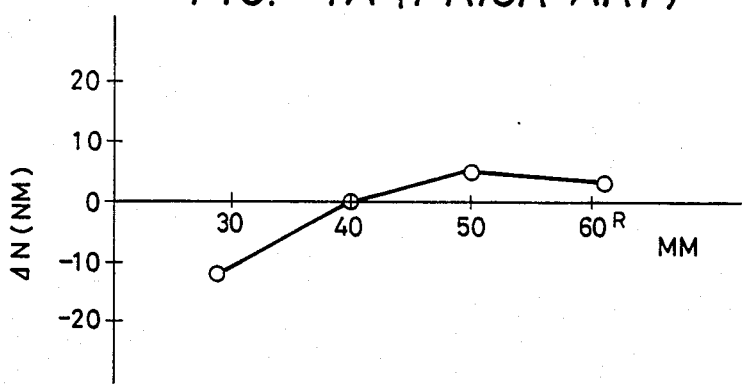
FIGS. 4A and 4B are charts showing the change in the distribution of double refraction in the optical disk substrate produced by a conventional process

A similar plastic substrate was prepared by injection molding in the same manner as in the foregoing example, except that the double refraction was maintained low over the entire surface according to the conventional process, as shown in FIG. 4A.

Figure 4B:
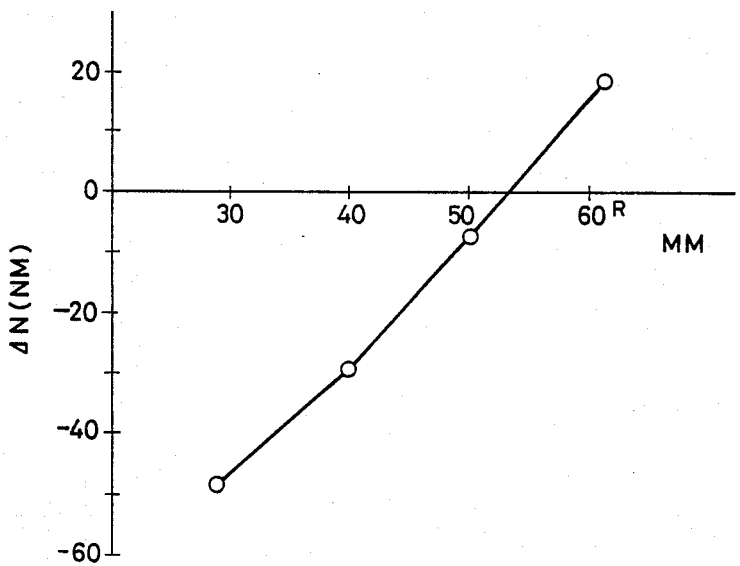

FIG. 4B shows the double refraction obtained after said plastic substrate was subjected to heat treatment of 6 hours at 90° C. As will be apparent from FIG. 4B, the substrated prepared in the conventional process shows an area of undesirably high double refraction after heating.

The present invention is not limited to the foregoing embodiment but can be used in various applications. For example it is applicable in the production of optical disks in which information is detected by the light transmitted by the recording surface. The present invention includes such modifications and applications, as long as it is within the scope and spirit of the appended claims.

We claim:

1. A process for producing a substrate for optical disks, comprising steps of:
   forming a disk-shaped substrate with polycarbonate with such gradient distribution of double refraction that the value of double refraction is in a range from −10 to −30 nm in the vicinity of the external periphery of said substrate and is in a range from +10 to +30 nm in the vicinity of the center thereof; and
   annealing thus formed substrate.

2. A process according to claim 1, wherein said annealing is conducted by heating said substrate at a temperature lower by 10° to 60° C. than the glass transition temperature of said substrate, for a period of 1 to 6 hours.

3. A process according to claim 1, wherein said forming is conducted in such a manner that the fluctuation of double refraction on any concentric circle of the substrate does not exceed 5 nm.

4. A process according to claim 1, wherein the temperature of molds used in said forming is in a range of 110° to 130° C.

5. A process according to claim 1, wherein the temperature of molds used in said forming is higher by 10° to 20° C. in an area thereof corresponding to the external periphery area of the substrate than in an area corresponding to the central area of the substrate.

6. A process according to claim 1, wherein said forming is conducted by injection molding, of which injection speed is gradually increased from the central area of the substrate toward the external periphery area thereof.

7. A process for producing a substrate for optical disks, comprising the steps of:
   forming a disk-shaped substrate having a uniform thickness such that the value of double refraction changes from a minus to a plus as the substrate changes from its external peripheral to its center where the value of double refraction is plus at a compression stress state and is minus at a tension stress state; and
   annealing such substrate.

8. A process according to claim 7, wherein said annealing is conducted by heating said substrate at a temperature 10° to 60° C. lower than the glass transition temperature of said substrate for a period of 1 to 6 hours.

9. A process according to claim 7, wherein said forming step is conducted such that the fluctuation of double refraction on any concentric circle of the substrate does not exceed 5 nm.

10. A process according to claim 7, wherein said forming step utilizes a molding temperature of 110° to 130° C.

11. A process according to claim 7, wherein said forming step utilizes a molding temperature which is higher by 10° to 20°C. in an area corresponding to the external periphery of the substrate than in an area corresponding to the central area of the substrate.

12. A process according to claim 7, wherein said forming step is conducted by injection molding, wherein the injection speed gradually increases from the central area to the external periphery area of the substrate.

* * * * *

UNITED STATES PATENT AND TRADEMARK OFFICE
CERTIFICATE OF CORRECTION

PATENT NO. : 4,892,692

DATED : January 9, 1990

INVENTOR(S) : KUNIO TAKADA, ET AL.

It is certified that error appears in the above-identified patent and that said Letters Patent is hereby corrected as shown below:

COLUMN 2

Line 16, "abovemen-" should read --above-men- --.

COLUMN 4

Line 41, "peripheral" should read --periphery--.

Signed and Sealed this

Thirtieth Day of April, 1991

Attest:

HARRY F. MANBECK, JR.

Attesting Officer

Commissioner of Patents and Trademarks